Sept. 10, 1963　　I. A. GREENWOOD, JR　　3,103,623
NUCLEAR GYROSCOPE
Filed April 19, 1960　　3 Sheets-Sheet 1

$\mathit{Fig\text{-}1}$ $\mathit{Fig\text{-}2}$

INVENTOR.
IVAN A. GREENWOOD, JR.

BY
ATTORNEY.

INVENTOR.
IVAN A. GREENWOOD, JR.

BY

ATTORNEY.

3,103,623
NUCLEAR GYROSCOPE
Ivan A. Greenwood, Jr., Stamford, Conn., assignor to General Precision, Inc., a corporation of Delaware
Filed Apr. 19, 1960, Ser. No. 23,335
17 Claims. (Cl. 324—.5)

This invention relates to devices for sensing rotation relative to an inertial frame.

The invention makes use of the properties of molecules and of molecular and atomic particles, and particularly of the property of nuclei in a liquid or gas by which they are decoupled from angular motions of the container. More specifically the invention relates to such devices which simultaneously employ the properties of two kinds of nuclei and utilize two or more separate but related magnetic fields.

The invention provides an arrangement by which suitable instrumentation is coupled to two or more aggregations or samples of nuclei so as to discern changes in the instrument frame orientation relative to inertial space. The invention is therefore useful in determining changes in the orientation and the rotational speed of a system relative to the frame of the fixed stars.

As an example, two separate magnetic fields are provided, each homogeneous and unidirectional. A nuclear aggregate is prepared containing two selected kinds of atomic nuclei. This aggregate is divided into two identical samples. It is preferable that the two kinds of nuclei be intimately associated in a gas or liquid. Each sample is placed in one of the magnetic fields, and nuclear magnetic resonances (NMR) are observed by the absorption method, the induction method or some other standard method, and the apparent Larmor precession frequency for each kind of nuclei in each gap is measured by phase comparison methods. A signal is thereby derived representative of the changes of angular position of the instrument frame relative to inertial space axes.

The two kinds of nuclei which are selected for use in this invention must each have observable magnetic moment and observable associated angular or gyroscopic momentum. Each kind of nucleus should give a strong nuclear magnetic resonance signal. The ratio of the magnetic moment and the angular momentum of a nucleus is termed the magnetogyric ratio or the nuclear constant, and is represented by $\gamma$. This quantity is sometimes also referred to as the gyromagnetic ratio. It is of course well understood that the effective nuclear constant, or effective gamma, is sometimes different from the magnetogyric ratio as just defined because of such effects as chemical shift, and this effective nuclear constant must be employed in all calculations when high accuracy is required.

Examples of pairs of nuclei which may advantageously be used include the nuclei of fluorine, of mass number 19, and of hydrogen. These have the nuclear constants 4007 and 4257 cycles per second per gauss. Hydrogen and phosphorus nuclei in an aqueous solution of orthophosphoric acid are another suitable pair of nuclei having constants 4257 and 1723. A third suitable pair consists of the nuclei of deuterium and hydrogen in a mixture of heavy and ordinary water. Their constants are 653.6 and 4257. Although these pairs of nuclei are especially suitable, numerous other pairs may be used alternatively to carry out the purposes of this invention.

The invention, in one form, employs two magnetic gaps having unidirectional magnetic fields which are parallel to each other but are oppositely directed. The magnetic gaps are formed in a magnetic structure which is rigidly associated with the remainder of the apparatus. A nuclear aggregate or sample is positioned in each field, each of the two samples containing nuclei of the same two kinds. As an example, fluorine and the proton are employed. Apparatus is employed for exciting the nuclei and deriving from them nuclear magnetic resonance signals. By phase comparison methods one pair of the four signals is fed back to control the magnetic field strength in such a way that any requirement for independent knowledge of the absolute field magnitude is eliminated. From the other pair of the four signals there is derived a signal representing the integral of the rate of rotation of the apparatus about one of its magnetic field directions. This rate of rotation is relative to inertial space, that is, relative to the positions of the fixed stars.

The use of two separate magnetic gaps, each with its own nuclear sample, permits the cross-comparison of phase and eliminates the necessity for an external phase reference.

The instrumentalities and methods used to excite the nuclei and derive the nuclear magnetic resonance signals from them may include forced precession and free precession methods. In one embodiment of the invention the F. Bloch induction method is employed as described in Patent No. Re. 23,950. This method is associated, in this embodiment, with the Hershberger regenerative feedback circuit which eliminates the need for external oscillators to excite the nuclei, as described in Patent No. 2,589,494. This Hershberger circuit may be termed a spin generator.

In another embodiment the adiabatic rapid passage method is used to secure the nuclear magnetic resonance signals. This method is described in Comptes Rendus a Academie des Sciences, Paris, volume 246, June 30, 1958, on pages 3608–3610, in an article entitled "A Maser With Purely Nuclear Magnetic Resonance," by Benoit, Griver and Guibe.

In still another embodiment the principles of the invention are embodied in a device having three degrees of freedom, which determines the integrals of the three angular rates of rotation relative to the fixed star frame, employing at least four nuclear samples of two kinds of nuclei in at least four magnetic fields.

One purpose of this invention is to measure changes in orientation of a body relative to an inertial axis by employing the gyroscopic properties of two kinds of atomic nuclei in two associated unidirectional magnetic fields.

Another purpose of this invention is to measure changes in orientation of a body by securing nuclear magnetic resonance signals from four nuclear samples in four magnetic fields, each sample containing the same two kinds of nuclei, and by phase comparison methods securing three signals representing orientation changes relative to three orthogonal axes of inertial space.

Another purpose of this invention is to measure changes of orientation of a body as described relative to any three space axes, which need not be orthogonal.

A further understanding of the invention may be secured from the detailed description and associated drawings, in which.

Figure 1:
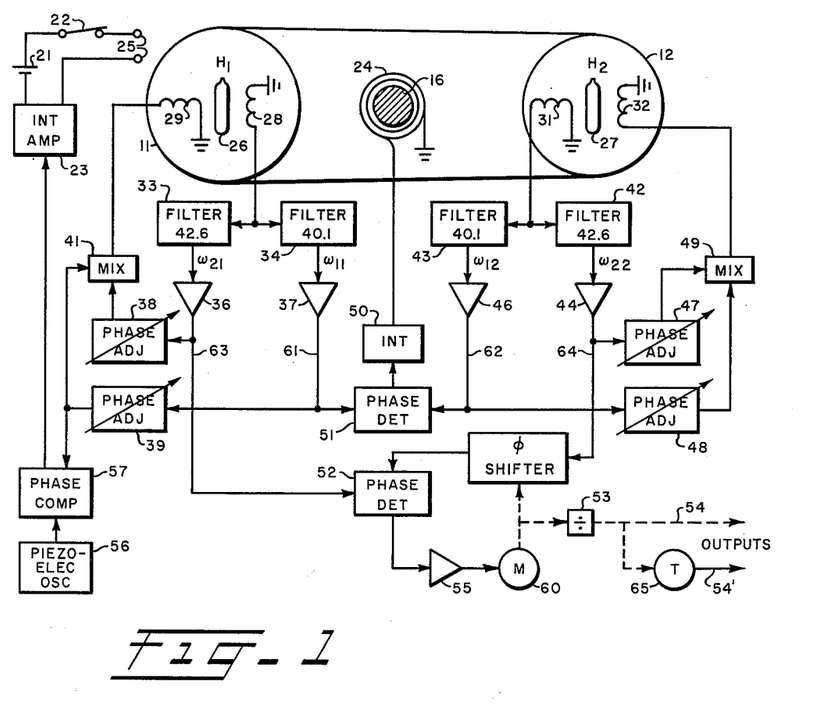
FIGURE 1 depicts an embodiment of the invention employing the Bloch induction method and spin generators to secure four nuclear magnetic resonance signals, and from them a single output signal.
Figure 2:
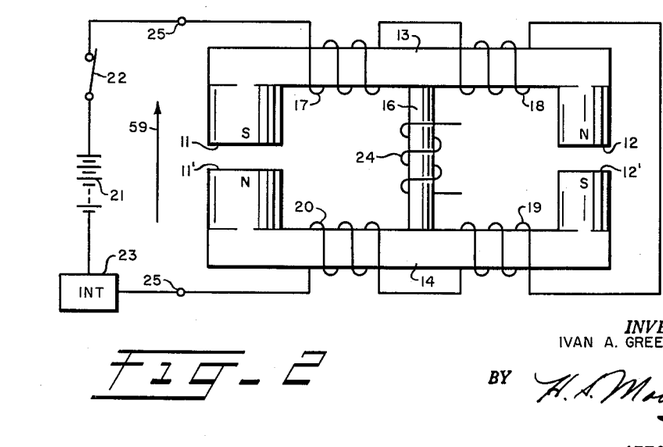
FIGURE 2 illustrates one form of magnetic structure which may be employed in carrying out the invention.

Referring now to FIGURES 1 and 2, a soft iron magnetic structure has two air gaps having poles 11, 11', 12 and 12'. Two of the pole faces, 11 and 12, are shown in plan view in FIGURE 1 and the edges of all four are visible in FIGURE 2. Poles 11 and 12' have south polarity and 11' and 12 have north polarity. The diameter of circular poles 11 and 11' is somewhat greater than that of the circular poles 12 and 12' in order to secure a lower magnetic flux density at the poles 11—11' than at the poles 12—12'. The poles 11 and 12 are connected by an iron bar 13 and poles 11' and 12' are connected by a second bar 14. Bars 13 and 14 are connected by bias core 16. The magnetic structure is provided with four magnetizing windings, 17, 18, 19 and 20, connected in series aiding and having terminals 25. These terminals are connected to a direct current source 21 with such polarity that the four magnetic poles are formed as described. The source 21 is provided with a switch 22. The output of an integrating amplifier 23 is connected in series with the source 21 for control purposes, as will be explained. This magnetic structure is so designed that the fields of the two gaps are parallel but oppositely directed, and substantially equal numbers of lines of magnetic flux pass through the two gaps. However, because of the difference in gap cross sectional areas, the magnetic flux density due to the four windings is slightly greater in the smaller diameter gap, between the pole faces 12 and 12', than it is between pole faces 11 and 11'.

The iron core 16 is joined to the structures 13 and 14 at equal magnetomotive force points, so that no flux due to the coils 17, 18, 19 and 20 passes through it. The core 16 is provided with a coil 24. Energization of this core with direct current of the proper polarity increases the flux density in the magnetic gap 11 and decreases the flux density in the other magnetic gap so that at some value of current the two gap densities are exactly equal. At values above and below this current, the two gap densities can be made unequal in either direction. Thus the bias coil 24 permits use of an adjustable magnitude of a single selected current sense to bias the magnetic gaps differentially, that is, in either direction.

It will be evident that, in place of the single magnetic structure of FIGURE 2, two entirely separate magnetic circuits could be employed, one for each of the magnetic gaps positioned as described, with appropriate bias coil control to permit equalization of the flux densities by the adjustment of a control current. It is also possible to generate the magnetic gap fields in other ways, such as by the use of permanent magnets in place of the electromagnets.

The pairs of pole faces enclosing the two gaps are plane and parallel, and their surfaces are smooth, to assure maximum uniformity and homogeneity of the magnetic field in each gap. Numerous other or additional means may be used to the same end, such as by shimming with sheet metal or field shaping by pole-face coils.

The nuclear samples are contained in two flasks, 26 and 27, FIGURE 1. Each flask is positioned in a respective one of the two magnetic air gaps, normally in the region of maximum field homogeneity. The flask 26 is positioned in the gap between the pole faces 11 and 11', and the flask 27 is positioned in the gap between the pole faces 12 and 12'. The flasks contain identical material, for example, a solution of trifluoracetic acid in water. The fluorine nucleus and the hydrogen nucleus, or proton, constitute the two kinds of nuclei employed in this embodiment of the invention. A receiving coil 28 and energizing coil 29 are positioned closely adjacent to the sample in flask 26 and preferably closely surrounding it. The axes of the coils 28 and 29 are positioned mutually at right angles and also perpendicular to the direction of the magnetic field generated by the poles 11 and 11'. The coils 31 and 32 are identically arranged in the other magnetic gap. The receiving coil 31 and energizing coil 32 closely surround the sample in flask 27 with coil axes mutually perpendicular and normal to the field. The arrangements in the two gaps are identical.

The receiving coil 28 is connected to two band pass filters 33 and 34 having center frequencies of approximately 42.6 megacycles per second and 40.1 megacycles per second, respectively. The outputs are amplified in amplifiers 36 and 37 and transmitted through two manually adjustable phase shifters 38 and 39 to a mixer 41 which mixes the two inputs without modulation. The phase shifters 38 and 39 permit neutralization of small phase shifts suffered in the amplifiers or other parts of these circuits. The output of mixer 41 is connected to the energizing coil 29.

The closed regenerative loop consisting of receiving coil 28, filter 34, amplifier 37, phase adjuster 39, mixer 41 and energizing coil 29, taken together with the coupling role played by the fluorine nuclei in the flask 26, constitute a spin generator. It operation is started by fortuitous electrical noise at the transmission band frequencies of filter 34. This noise is amplified, causes some energization of the fluorine nuclei and results in a nuclear magnetic resonance signal. This signal is regeneratively built up to a usable magnitude.

Similarly, the closed loop consisting of coil 28, filter 33, amplifier 36, phase adjuster 38, mixer 41 and coil 29, in cooperation with the proton nuclei in the sample, constitutes another spin generator circuit operating in the same manner as the spin generator just described.

The receiving coil 31 is connected to two filters 42 and 43 having transmission bands centered at 42.6 mc. p.s. and 40.1 mc. p.s., respectively. These filters are connected through amplifiers 44 and 46, and phase adjusters 47 and 48 to a mixer 49 which mixes without modulating. The mixer 49 output is connected to the energizing coil 32.

The closed regenerative loop consisting of coil 31, filter 42, amplifier 44, phase adjuster 47, mixer 49 and coil 32 constitutes a spin generator circuit and the closed regenerative loop consisting of coil 31, filter 43, amplifier 46, phase adjuster 48, mixer 49 and coil 32 constitutes another spin generator circuit. Both of these spin generator circuits operate in the same manner as the spin generator just described.

The nuclear magnetic resonance signals at the outputs of amplifiers 37 and 46 are applied to a phase detector 51, the output of which is connected through an amplifier 50, preferably an integrating amplifier, to the field bias coil 24. The nuclear magnetic resonance signal at the output of amplifier 36 is applied to one input of a phase detector 52. The signal at the output of amplifier 44 is applied through a phase shifter 45 to the other input of phase detector 52. The error output of phase detector 52 is amplified in an amplifier 55 and applied to a motor 60 which shifts the phase of phase shifter 45 in such direction as to reduce the error output of detector 52. The motor 60 shaft is also connected to a dividing element, 53, which may comprise a speed-reducing gear. The divided output at the element 53 output shaft 54 constitutes the system or nuclear gyroscope angular position output. This output may be differentiated by a tachometer generator, 65, to produce at conductor 54' an output voltage. This voltage constitutes a second system output representing the rotational rate of the system in space with respect to the axis defined by the direction of the magnetic field.

A piezoelectric-crystal-controlled oscillator 56 is designed to oscillate at the Larmor frequency of the fluorine nucleus of 40.1 mc. p.s. in a 10 kilogauss field. Its output is applied to one input of a comparator 57 having the other input connected to the output of phase adjuster 39. The output of comparator 57 is connected to the input of the integrating amplifier 23. The output terminals of the integrating amplifier 23 are connected in series with the direct-current source 21 and the magnetizing coil terminals 25.

It is preferred that comparator 57 be a phase comparator. However, the purpose of this invention may be carried out by employing a frequency comparator at this point.

In the operation of the circuit and structure of FIGURES 1 and 2, assume an average unidirectional magnetic flux density of approximately 10 kilogauss in each of the two magnetic gaps defined by the pole faces 11, 11′, and 12, 12′, the fields being designated $H_1$ and $H_2$, respectively. Although the direction 59, FIGURE 2, of one of the magnetic gap fields need not be fixed relative to space axes, it is convenient in a first explanation to assume that this direction is fixed. Let it also be assumed, to begin with, that the instrument is non-rotating about direction 59 relative to the fixed space axes.

The Larmor frequency of precessional rotation of the fluorine nucleus in the 10-kilogauss field $H_1$ of gap 11/11′ is $$\omega_{F1} = \gamma_F H_1 \qquad (1)$$

in which $\gamma_F$ is the fluorine effective nuclear constant. Similarly, the fluorine Larmor frequency in field $H_2$ is $$\omega_{F2} = \gamma_F H_2 \qquad (2)$$

The Larmor frequencies for the hydrogen nucleus, the proton, in these fields are $$\omega_{H1} = \gamma_H H_1 \qquad (3)$$

and $$\omega_{H2} = \gamma_H H_2 \qquad (4)$$

in which $\gamma_H$ is the proton effective nuclear constant. The nuclear magnetic resonance signals at the outputs of the four spin generators, at the conductors 61, 62, 63 and 64, as observed and measured under the assumptions made, will have these frequencies.

Now let it be assumed that the instrument is rotating about the direction 59 relative to fixed axes at the speed $\omega$. The above equations become $$\omega_{11} = \gamma_F H_1 + \omega \qquad (5)$$
$$\omega_{12} = \gamma_F H_2 - \omega \qquad (6)$$
$$\omega_{21} = \gamma_H H_1 + \omega \qquad (7)$$
$$\omega_{22} = \gamma_H H_2 - \omega \qquad (8)$$

The left terms $\omega_{11}$, $\omega_{12}$, $\omega_{21}$ and $\omega_{22}$ are now different from the Larmor frequencies and are the apparent Larmor frequencies. They are the frequencies which would be observed at conductors 61, 62, 63 and 64, respectively, by an observer rotating with the instrument as it rotates relative to the inertial frame of reference. The sign of $\omega$ in (6) and (8) is opposite to that in (5) and (7) because the directions of the two magnetic fields are opposite. Integration of the Equations 5, 6, 7 and 8 with respect to time transforms them to equivalent phase relationships, namely, $$\phi_{11} = \gamma_F \int_0^t H_1 dt + \theta \qquad (9)$$

$$\phi_{12} = \gamma_F \int_0^t H_2 dt - \theta \qquad (10)$$

$$\phi_{21} = \gamma_H \int_0^t H_1 dt + \theta \qquad (11)$$

$$\phi_{22} = \gamma_H \int_0^t H_2 dt - \theta \qquad (12)$$

In these equations the phases $\phi_{11}$, $\phi_{12}$, $\phi_{21}$ and $\phi_{22}$ are the total accumulated electrical phase angles of the signals in the filter outputs at conductors 61, 62, 63, and 64, respectively. Since phase is the integral of frequency, $\theta$ is the mechanical angle by which the instrument is displaced from a reference position in the inertial frame about direction 59. Thus the angle $\theta$ is measured in a plane perpendicular to the direction 59, which may be termed the Z-direction.

If, in Equations 9 and 10, $$\phi_{11} = \phi_{12} \qquad (13)$$

then $$\int_0^t H_1 dt - \int_0^t H_2 dt = -\frac{2\theta}{\gamma_F} \qquad (14)$$

From Equations 11 and 12

$$\phi_{21} - \phi_{22} = \gamma_H \left[ \int_0^t H_1 dt - \int_0^t H_2 dt \right] + 2\theta \qquad (15)$$

Combining and solving for $\theta$, $$\theta = \frac{\phi_{21} - \phi_{22}}{2\left[1 - \dfrac{\gamma_H}{\gamma_F}\right]} \qquad (16)$$

The relation of Equation 13 has the physical meaning that the phase of the output of amplifier 37 is made equal to the phase of the output of amplifier 46. This is done by comparing the phases in phase detector 51, securing an error signal therefrom representing the phase difference, and feeding the error signal back through integrating amplifier 50 to bias coil 24 to change the field strength difference, $H_1 - H_2$, thus bringing the error signal to a null, at which time the phases are equal. In the process the field strengths are made of such values that the Equation 14 is satisfied.

It is obvious that, when the phases $\phi_{11}$ and $\phi_{12}$ are made equal, the corresponding frequencies $\omega_{11}$ and $\omega_{12}$ are also made equal. Thus the entire portion of the circuit may be regarded as a phase and frequency comparator and equater.

The subtraction of phases $\phi_{21}$ and $\phi_{22}$ to form the numerator of Equation 16 is carried out in the phase detector 52. In order, however, to provide a non-cyclical output, the error signal output of the phase detector is fed back through motor 60 and phase shifter 45 to bring the error signal to null, at the same time generating an output at the motor shaft representing the phase difference $\phi_{21} - \phi_{22}$. This quantity is divided in component 53 by the amount of the denominator of Equation 16 to form at shaft 54 an angular deflection representing $\theta$.

The function of the piezoelectric oscillator 56 is to stabilize the field strength to such a degree as to permit the filters to operate at their resonant peaks. The use of this oscillator also relaxes design requirements. Since its operation does not directly affect the output its frequency stability need not be extreme.

In the operation of this oscillator, with zero error signal from the phase comparator 57, the output of integrator 23 is set at such level that the magnetic effect of the magnetizing coils connected to terminals 25 is at a selected design level. When conditions change as, for example, by change of the power supply voltage, presence of external stray fields, or by change of the temperature and resistance of the magnetizing coils, the magnetic field strengths are changed. This affects the frequency and phase applied from amplifier 37 to the phase comparator 57, generating an error signal output. This error signal changes the integrator 23 output in such direction as to restore the error signal to zero.

The adiabatic rapid passage method of exciting the nuclei and of securing the nuclear magnetic resonance signal has some advantages over other methods. Consequently an arrangement for use of this method is presented in FIGURE 3.

Figure 3:
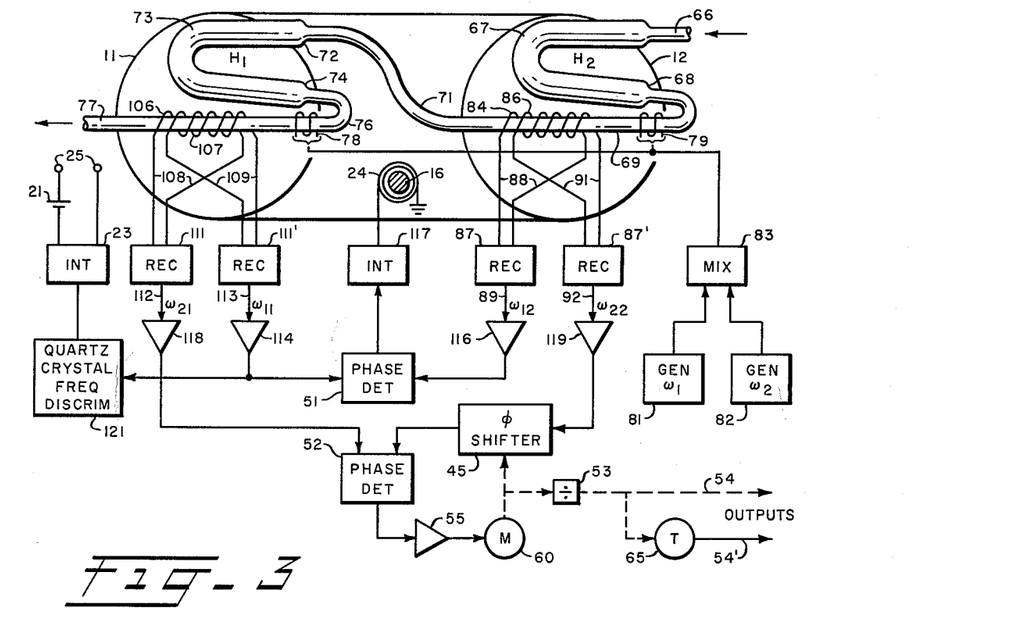
FIGURE 3 depicts an embodiment of the invention employing the adiabatic rapid passage method to secure four nuclear magnetic signals, and from them a single output signal.

The magnetic structure of FIGURE 2 is employed, with the pole faces 11 and 12 depicted in FIGURE 3 as well as the bias coil 24 and the energizing coil terminals 25. The same two kinds of nuclei, of fluorine and hydrogen, are employed as in the previously-described embodiment and in the same form of a solution of trifluoracetic acid in water. In this case a single flowing sample is employed which is pumped through a pipe system running through both magnetic field gaps.

In FIGURE 3 the liquid sample containing the fluorine and hydrogen nuclei is pumped into a pipe 66. As this pipe enters the working magnetic gap 12/12′ the pipe diameter becomes larger, thus reducing the velocity of flow and permitting any selected portion of the liquid to remain a longer time in the convolutions of the pipe within the gap. The enlarged pipe 67 is then reduced in size at 68 and the small pipe 69 proceeds diametrically from the edge of the pole face toward and across its center and out at the other side. The exit pipe 71 is then again enlarged at 72 where it enters the magnetic gap 11/11'. The convoluted large pipe 73 is again restricted in size at 74 and the small pipe 76 follows a diametral path across the center of the pole face to the exit 77.

The small diametral pipes 76 and 69 are provided with energizing coil windings 78 and 79 positioned coaxially around the small pipes near the edges of the pole faces and perpendicular to the field direction. These coils 78 and 79 are supplied with power from two generators, 81 and 82, having frequencies $\omega_1$ and $\omega_2$. The generator outputs are combined in a mixing circuit 83, which does not intermodulate them, before application to the coils 78 and 79.

Two receiving coils, 84 and 86, are wound together around the pipe 69 at a selected distance downstream from the coil 79, and positioned so that their common center coincides with the center of the circular pole face, with their common axis perpendicular to the field direction. Their terminals 88 and 91 are respectively connected to two receivers 87 and 87' containing two circuits which are identical except in tuning, the output of one being the conductor 89 and the output of the other the conductor 92.

Figure 4:
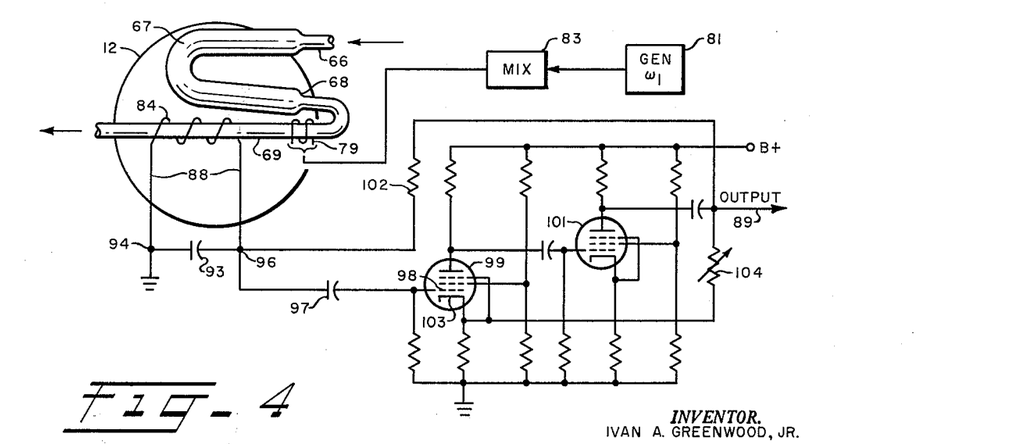
FIGURE 4 depicts a receiver used in the adiabatic rapid passage method illustrated in FIGURE 3.

One of these circuits, 87, is illustrated in detail in FIGURE 4. The coil 84 terminals 88 are connected to a capacitor 93 to resonate with the coil at the frequency $\omega_{12}$. The resonant circuit is connected to an amplifier arranged to apply negative resistance to the resonant circuit so that the resonant circuit has an exceedingly high figure of merit, commonly termed Q. The resonant circuit terminal 94 is grounded and the other terminal 96 is coupled through a capacitor 97 to the input control grid 98 of a pentode 99 forming the first stage of an amplifier having an even number of signal inversions. As an example, a second stage pentode, 101, is depicted to form a two-stage amplifier. Positive feedback is secured by connecting the output conductor 89 to the input terminal 96 through a resistor 102 to help in controlling the feedback. Adjustment is provided through the medium of a rheostat 104 connected in a negative feedback extending from the output 89 to the cathode 103 of the tube 99. By adjusting the rheostat 104 the negative resistance applied to the resonant circuit can be adjusted as nearly as desired to the point of oscillation. This circuit thus causes the resonant circuit consisting of coil 84 and capacitor 93 to exhibit high Q.

In FIGURE 3 the pipe 76 in the magnetic gap 11/11' is provided with two coils, 106 and 107, wound together at a selected distance downstream from the energizing coil 78 and located at the center of the magnetic gap 11/11'. Their terminals 108 and 109 are connected to two receivers, 111 and 111', identical with receivers 87 and 87', having two output terminals 112 and 113.

The receiver output terminals 113 and 89 are connected through amplifiers 114 and 116 to the phase detector 51. The output of the phase detector 51 is in turn connected through an integrating amplifier 117 to the magnetic bias coil 24. The receiver output terminal 112 is connected through amplifier 118 to the phase detector 52. The receiver output terminal 92 is connected through amplifier 119 and a phase shifter 45 to the phase detector 52. The error output of phase detector 52 is amplified in amplifier 55 and applied to motor 60, which shifts the phase of phase shifter 45 in such direction as to reduce the error output of detector 52. The motor 60 shaft is also connected to a dividing element, 53, which may comprise a speed reducing gear. The divided output at the element 53 output shaft 54 constitutes the system or nuclear gyroscope angular position output. This output may be differentiated by a tachometer generator, 65, to produce an output voltage at conductor 54' proportional to shaft speed. This voltage constitutes a second system output representing the rotational rate of the system in space.

The output of amplifier 114 is connected to a quartz crystal frequency discriminator 121 tuned to the fluorine nuclear frequency $\omega_{11}$. This discriminator may, as an example, consist of a piezoelectric oscillator and phase comparator such as oscillator 56 and comparator 57, FIGURE 1, and operating and functioning similarly. The output is applied, through an integrating amplifier 23, FIGURE 3, to the terminals 25 for control of the flux densities of both magnetic gap fields.

In the operation of the circuit of FIGURES 3 and 4, the sample including fluorine nuclei flows through the large pipe 67, where it passes for a relatively long time through the magnetic field of strength $H_2$ equalling approximately 10 kilogauss. The nuclei are thus oriented in the field direction. The sample, or a small portion of it considered to be under observation for the purpose of description, now passes through that part of pipe 69 which is surrounded by the energizing coil 79. This part of the pipe passes through the constant-direction field from the edge of the pole face to a point nearer the center. This radial path within coil 79 is subjected to a magnetic field which varies somewhat in strength, being least at the edge of the pole because of magnetic fringing, and greatest at the point nearest the center but still less than the 10 kilogauss strength at the center of the pole face. The coil 79 is supplied with alternating current from generator 81 having a frequency $$\omega_1 = \gamma_F H_{av} \tag{17}$$

in which $H_{av}$ is the field density at or near the center of coil 79. The accuracy and stability of generator 81 need only be consistent with the field gradient along coil 79. The effect of this alternating current on the fluorine nuclei is to reverse their orientations, or to "flip" them 180° to a higher energy state. The sample under consideration now flows toward coil 84, undergoing some relaxation but not losing appreciable energy as coherent radiation. When the sample arrives within the effective volume of coil 84 it is subjected to the 10 kilogauss field, and because the sample is coupled to coil 84 which is capable of absorbing energy at the proper frequency, and because the emission is coherent, being stimulated emission, the sample gives up energy to the coil. Thus the coil receives a nuclear magnetic resonance signal at the frequency $$\omega_{F2} = \gamma_F H_2 \tag{2}$$

when the instrument is stationary in space, or at the frequency $$\omega_{12} = \gamma_F H_2 - \omega \tag{6}$$

when rotating. The frequencies $\omega_1$ and $\omega_{12}$ are different because the fields in coil 79 and at the middle of the pole face are different. Therefore the output in conductors 88 is decoupled and isolated from the output of generator 81, the frequencies being different. This isolation removes a difficulty common in such circuits.

Operation of the other coils 86, 106 and 107 with associated circuits is similar to that just described, producing the signals having frequencies $\omega_{22}$, $\omega_{21}$ and $\omega_{11}$ in the conductors 92, 112 and 113, respectively. The remainder of the circuit is the same as the circuit of FIGURE 1 and operates similarly, omitting the spin generator feedback loops, which are unnecessary because of the provision of generators 81 and 82. Briefly, the signals having frequencies $\omega_{11}$ and $\omega_{12}$ are compared in phase detector 51 and the resulting error signal employed, through coil 24, to adjust the relative field densities to null the error signal. The general field strength is controlled by the piezoelectric device 121 in a feedback loop. The signals having frequencies $\omega_{21}$ and $\omega_{22}$ are compared in the servomechanism consisting of phase shifter 45, phase detector 52, and motor 60, and the output, divided at divider 53, serves at shaft 54 as the instrument space phase output, with a rate output obtained at conductor 54'.

The foregoing descriptions are confined to the case of a nuclear gyroscope having one degree of freedom. The common direction 59 of the parallel magnetic fields was assumed, to facilitate description, to be fixed in space and the instrument measures rotations about this direction only. However, it is not necessary that the common field direction 59 be fixed in space. The instrument may have any rotational motion relative to inertial space, both around the instrument direction 59 and around any other directions simultaneously. Operation of the instrument is still as described, but the output quantity will depend upon the space rotational path followed by the reference axis 59.

In order to provide complete three-axial instrumentation three such systems could be employed. It would be preferable to have their reference directions, parallel to their magnetic fields and analogous to reference direction 59, mutually at right angles. However, since any three axes which are not coplanar also can be employed to define a volume, the three reference directions need not be mutually at right angles so long as they are not all in the same plane.

It has been found that it is not necessary to employ three such complete systems having a total of six magnetic field gaps. The same result can be accomplished more simply and economically using only four working magnetic gaps.

Figure 5:
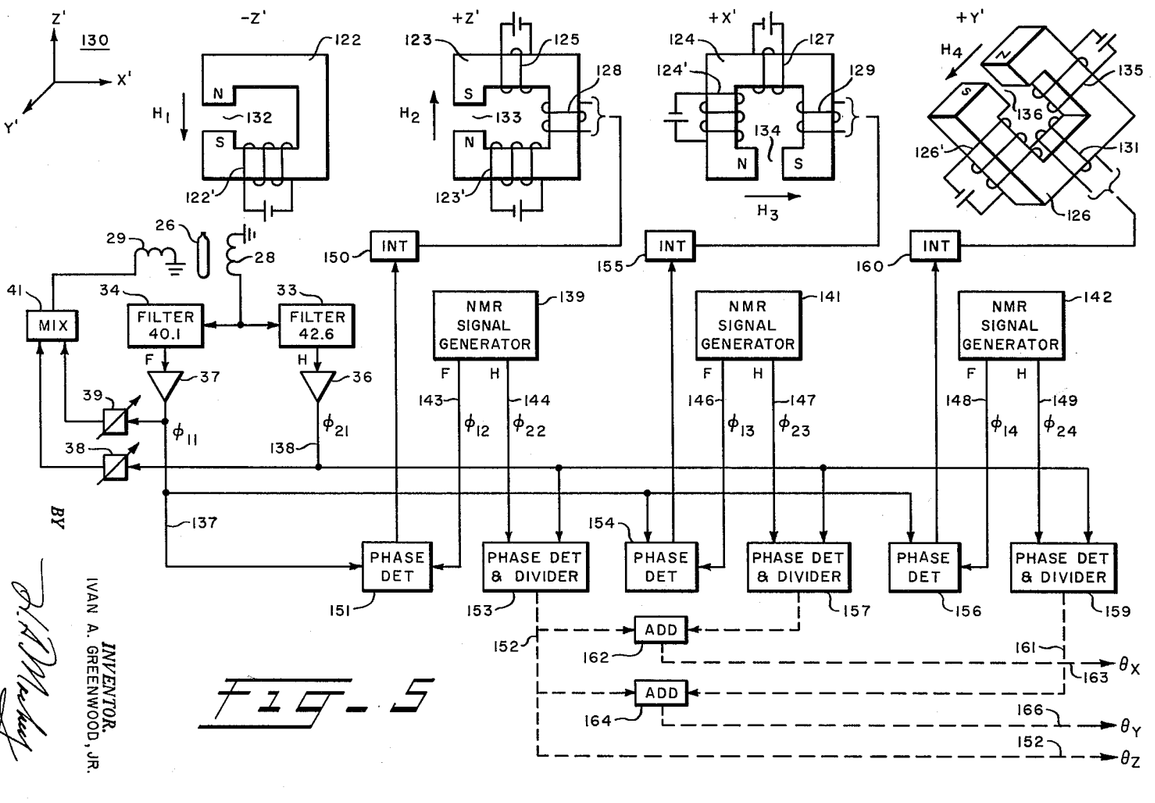
FIGURE 5 illustrates an arrangement for obtaining three signals representing orientation in the three directions of inertial space.

FIGURE 5 shows instrumentation devised for such three-axial measurement. In this figure four separate magnetic structures 122, 123, 124 and 126 are provided, each consisting of an iron core which, by means of energizing windings 122', 123', 124', and 126', produce a constant-direction field of 10 kilogauss intensity across an air gap in the core. The iron cores 123, 124 and 126 are provided with bucking coils 125, 127 and 135 respectively, so poled as to reduce the magnetic effects of the energizing windings 123', 124' and 126' by slight amounts. The iron cores 123, 124 and 126 are also provided with biasing windings 128, 129 and 131, so poled as to augment the magnetic effects of the energizing windings 123', 124' and 126'.

In the operation of these windings, the energizing windings 122', 123', 124' and 126' alone generate almost exactly equal magnetic intensities in the four gaps 132, 133, 134 and 136. The three bucking windings 125, 127 and 135 are adjusted so that they reduce the magnetic intensities in their associated gaps 133, 134 and 136 equally and slightly below the intensity in gap 132. The three bias windings 128, 129 and 131, under automatic operation which will be described, and each energized by direct current of a single selected sense of adjustable amplitude, are capable of controlling the magnetic intensity in each of the gaps 133, 134 and 136 to be equal to, less than, or more than the intensity in gap 132.

The four magnetic structures are so positioned that the directions of the fields in their air gaps are preferably orthogonal and point in directions defined as the instrument axes X', Y' and Z', these axes being indicated in the 3-dimensional oblique diagram 130. In accordance with these axial directions the downward direction of the field in the gap 132 of magnetic structure 122 is in the negative Z'-direction. The field in gap 133 of structure 123 being opposite, is in the positve Z'-direction. The direction of the field in the gap 134 of structure 124 is toward the right and termed the +X'-direction, and the direction of the field 136 in the structure 126, shown as an oblique sketch, is defined as perpendicular to the other two directions and is termed the +Y'-direction.

In each of these four magnetic gaps a sample is placed containing fluorine and hydrogen nuclei. The Bloch induction method with spin generators, as previously described, is used to secure two nuclear magnetic resonance signals representing the apparent Larmor frequencies of precession of these two nuclei in the field applied to the sample. The components in each gap and for securing the signal are alike and are those shown and described in connection with FIGURE 1. In FIGURE 5 those components which are in the air gap 132 are the flask 26 containing the two kinds of nuclei, fluorine and hydrogen, a receiving coil 28 and an energizing coil 29. These components are here shown as separated from the gap for clarity but are actually disposed within the gap exactly as described in connection with pole face 11, FIGURE 1. The coil 28 is connected to two filters 34 and 33, which are connected through two amplifiers 37 and 36 and phase adjusters 39 and 38 to a mixer 41, the output of which is connected to energizing coil 29. These components are identical and operate in the same way as the correspondingly numbered components of FIGURE 1.

Each of the gaps 133, 134 and 136, FIGURE 5, has associated with it components identical with those just described. In each instance two output conductors are provided which carry the fluorine and hydrogen nuclear magnetic resonance signals similar to those imposed on respective conductors 137 and 138. These similar components associated with gaps 133, 134 and 136 for the purposes of simplicity are here indicated only by the rectangles 139, 141 and 142, which are provided with fluorine and hydrogen nuclear magnetic resonance output signal conductors 143, 144, 146, 147, 148 and 149.

The fluorine nuclear magnetic resonance signals in conductors 137 and 143 are compared in phase in a phase detector 151 and the error output signal, through an integrating amplifier 150, is used to adjust the bias coil 128 in such direction as to null the error signal. The phase detector 151 and integrating amplifier 150 are similar to the phase detector 51 and integrating amplifier 50 in FIGURE 1.

The hydrogen nuclear magnetic resonance signals in conductors 138 and 144 are compared in phase in a phase detector which is servoed to a null by a position servomechanism in the manner explained in connection with FIGURE 1. The components therein having the reference characters 45, 52, 53, 55, 60 and 65 are represented in FIGURE 5 by the rectangle 153.

The fluorine nuclear magnetic resonance signals in conductor 137 are also compared with those in conductor 146 in a phase detector 154, and the output after integration in integrating amplifier 155 is applied to the bias coil 129. Conductor 137 and conductor 148 are also connected to a phase detector 156 and integrating amplifier 160, the output of which is applied to bias coil 131.

The hydrogen nuclear magnetic resonance signals in conductor 138 are also compared with those in conductor 147 in a phase detector and dividing circuit component 157 having its output connected to shaft 158. The resonance signals applied to conductors 138 and 149 are impressed on a phase detector and dividing circuit component 159 having its output connected to shaft 161. These components 157 and 159 are similar to component 153.

The signal in shaft 152 is the $\theta_Z$ output of the instrument. The signals in shafts 152 and 158 are added in an adding component 162 to form, in shaft 163, the $\theta_X$ output of the instrument and the signals in shafts 152 and 161 are added in an adding component 164 to form, in shaft 166, the $\theta_Y$ output of the instrument.

In the operation of the circuit of FIGURE 5, the magnetic structures 122 and 123 together with all components in their air gaps and associated components are identical physically, in functions and in operation with those in FIGURES 1 and 2 with the exception that the magnetic structures in FIGURE 5 are separate, with the necessary changes in bias control entailed thereby. The instrument output in FIGURE 5, at shaft 152, termed $\theta_Z$, is identical with that at shaft 54, FIGURE 1. This output is the displacement angle of the instrument about its Z'-axis relative to inertial space. Since this output is referred to fixed space, that fact is indicated by leaving the term $\theta_Z$ unprimed.

The output, $\theta_Z$, at shaft 152, FIGURE 5, is given by $$\theta_Z = -\frac{\phi_{21}-\phi_{22}}{2\left(1-\frac{\gamma_H}{\gamma_F}\right)} \quad (16')$$

This is identical with Equation 16 except for sign and that $\theta_Z$ is substituted for $\theta$. $\phi_{21}$ is the observed phase of the hydrogen nuclear magnetic resonance signal secured from magnetic structure 122 and $\phi_{22}$ is the observed phase of the hydrogen signal secured from magnetic structure 123. Equation 16' is derived in a manner similar to the derivation of Equation 16 from Equations 9, 10, 11 and 12.

Similar equations for the $H_1$ and $H_3$ field structures 122 and 124 of FIGURE 5 are $$\phi_{11} = \gamma_F \int_0^t H_1 dt + \theta_Z \quad (9')$$

$$\phi_{21} = \gamma_H \int_0^t H_1 dt + \theta_Z \quad (11')$$

$$\phi_{13} = \gamma_F \int_0^t H_3 dt + \theta_X \quad (18)$$

$$\phi_{23} = \gamma_H \int_0^t H_3 dt + \theta_X \quad (19)$$

$\phi_{11}$ and $\phi_{21}$ are the fluorine and hydrogen nuclear magnetic resonance electrical phase angles observed in conductors 137 and 138, and $\phi_{13}$ and $\phi_{23}$ are the fluorine and hydrogen signal phases observed in conductors 146 and 147. The space phase angle $\theta_X$ about the X'-axis is found by equating $\phi_{11}$ and $\phi_{13}$ and solving Equations 9', 11', 18 and 19, giving $$\theta_X = \frac{\phi_{21}-\phi_{22}}{2\left(1-\frac{\gamma_H}{\gamma_F}\right)} - \frac{\phi_{21}-\phi_{23}}{\frac{\gamma_H}{\gamma_F}-1} \quad (20)$$

The first term on the right is the value of $\theta_Z$, and is represented by the amplitude of the $\theta_Z$ signal in shaft 152. It is applied to one side of the adding component 162. The second term on the right is represented by the amplitude of the signal in shaft 158 and is added in adding component 162 to form a signal in shaft 163 having amplitude representing $\theta_X$.

Similarly, the Y-axis output $\theta_Y$ is secured by adding the signal in shaft 152 to that in shaft 161 in adding component 164, and is described by the solution of equations:

$$\phi_{11} = \gamma_F \int_0^t H_1 dt + \theta_Z \quad (9')$$

$$\phi_{21} = \gamma_H \int_0^t H_1 dt + \theta_Z \quad (11')$$

$$\phi_{14} = \gamma_F \int_0^t H_4 dt + \theta_Y \quad (21)$$

$$\phi_{24} = \gamma_H \int_0^t H_4 dt + \theta_Y \quad (22)$$

in which $\phi_{14}$ and $\phi_{24}$ are the observed electrical phases in conductors 148 and 149. Equating $\phi_{11}$ and $\phi_{14}$ and solving for $\theta_Y$, $$\theta_Y = \frac{\phi_{21}-\phi_{22}}{2\left(1-\frac{\gamma_H}{\gamma_F}\right)} - \frac{\phi_{21}-\phi_{24}}{\frac{\gamma_H}{\gamma_F}-1} \quad (23)$$

The phases $\phi_{11}$ and $\phi_{14}$ are equated in the phase detector and control 156 and the error output is applied to the bias coil 131, adjusting the magnetic intensity, $H_4$, of the structure 126 to null the error signal. The output signal in shaft 161 then, when added in component 164 to the $\theta_Z$ signal, forms the $\theta_Y$ signal.

What is claimed is:

1. A particle gyroscope comprising, means producing at least two unidirectional magnetic fields in at least two different directions, a separate sample of material in each of said fields, each sample containing the same aggregates of at least two different selected kinds of particles in intimate association, means for producing a pair of particle magnetic resonance signals from each sample in each of said fields, the frequency of each of said particle magnetic resonance signals being dependent upon the particular kind of particles from which it is derived, upon the rate of rotation of said last-named means relative to inertial space about the direction of the magnetic field applied thereto and upon the magnetic flux density thereof, means for producing an equality in phase relationship between respective signals comprising one signal of each pair of particle magnetic resonance signals derived from each of two samples, and means for deriving an output signal representative of change of angular positon of the gyroscope in space from the other signal of each pair of particle magnetic resonance signals derived from each of two samples.

2. A particle gyroscope in accordance with claim 1 in which the kinds of said particles are restricted to atoms, atomic nuclei and fundamental particles including electrons.

3. A nuclear gyroscope comprising, means producing at least two unidirectional magnetic fields in at least two different directions, a separate sample of material in each of said fields, each sample containing the same aggregates of at least two different selected kinds of nuclei in intimate association, means for producing a pair of nuclear magnetic resonance signals from each sample in each of said fields, the frequency of each of said nuclear magnetic resonance signals being dependent upon the particular kind of nuclei from which it is derived, upon the rate of rotation of said last-named means relative to inertial space about the direction of the magnetic field applied thereto and upon the magnetic flux density thereof, means for producing an equality in phase relationship between respective signals comprising one signal of each pair of nuclear magnetic resonance signals derived from each of two samples, and means for deriving an output signal representative of change of angular position of the gyroscope in space from the other signal of each pair of nuclear magnetic resonance signals derived from each of two samples.

4. A nuclear gyroscope comprising, means producing two unidirectional magnetic fields in opposite directions, a separate sample of material in each of said fields, each sample containing the same aggregates of two different selected kinds of nuclei in intimate association, means for producing a pair of nuclear signals from each sample in each of said fields, the frequency of each of said nuclear signals being dependent upon the particular kind of nuclei from which it is derived, upon the rate of rotation of said last-named means relative to inertial space about the direction of the magnetic field applied thereto and upon the magnetic flux density thereof, means for producing an equality in phase relationship between respective signals comprising one signal of each pair of nuclear signals, and means for deriving an output signal representative of change of angular position of the gyroscope in space from the other signal of each pair of nuclear signals.

5. A nuclear gyroscope comprising, means producing two unidirectional magnetic fields in opposite directions, a separate sample of material in each of said fields, each sample containing the same aggregates of two different selected kinds of nuclei in intimate association, means for producing a pair of nuclear signals from each sample in each of said fields, the frequency of each of said nuclear signals being dependent upon the particular kind of nuclei from which it is derived, upon the rate of rotation of the said last-named means relative to inertial space about the direction of the magnetic field applied thereto and upon the magnetic flux density, means for deriving an output signal representative of change of angular position of the gyroscope in space by a comparison of the phase relationships of one similar frequency nuclear signal of each pair of signals, and means actuated by a phase comparison of the other nuclear signals of said two pairs of signals to render said output signal independent of the average strength of said magnetic fields.

6. A nuclear gyroscope comprising, means producing two unidirectional magnetic fields in opposite directions, a separate sample of material in each of said fields, each sample containing the same aggregates of two different selected kinds of nuclei in intimate association, means for producing a pair of nuclear signals from each sample in each of said fields, the frequency of each of said nuclear signals being dependent upon the particular kind of nuclei from which it is derived, upon the rate of rotation of said last-named means relative to inertial space about the direction of the magnetic field applied thereto and upon the magnetic flux density, whereby each pair of signals consists of a first signal whose frequency is a function of the effective nuclear constant of one of said kinds of nuclei and a second signal whose frequency is a function of the effective nuclear constant of the other of said kinds of nuclei, means for comparing said first signals to produce a comparison signal, means for differentially varying the flux densities of said magnetic fields by said comparison signal, and means for deriving an output signal from a comparison of said second signals.

7. A nuclear gyroscope comprising, means producing two unidirectional magnetic fields in opposite directions, a separate sample of material in each of said fields, each sample containing the same aggregates of two different selected kinds of nuclei in intimate association, means for producing a pair of nuclear signals from each sample in each of said fields, the frequency of each of said nuclear signals being dependent upon the particular kind of nuclei from which it is derived, upon the rate of rotation of said last-named means relative to inertial space about the direction of the magnetic field applied thereto and upon the magnetic flux density, whereby each pair of signals consists of a first signal whose frequency is a function of the effective nuclear constant of one of said kinds of nuclei and a second signal whose frequency is a function of the effective nuclear constant of the other of said kinds of nuclei, means for comparing the phases of said first signals and for producing an error signal therefrom the magnitude and sense of which is dependent on the relative amount and direction of phase displacement between said first signals, means for differentially varying the flux densities of said magnetic fields by said error signal in a direction to reduce said error signal to zero, and means for deriving an output signal from a phase comparison of said second signals.

8. A nuclear gyroscope comprising, means producing two unidirectional magnetic fields in opposite directions, a sample of material in each of said fields, each sample containing aggregates of the same two selected kinds of nuclei in intimate association, means for producing a pair of nuclear signals from each sample in each of said fields, the frequency of each of said nuclear signals being dependent upon the particular kind of nuclei from which it is derived, the rate of rotation of said last-named means relative to inertial space about the direction of the magnetic field applied thereto and upon the magnetic flux density, whereby each pair of signals consists of a first signal whose frequency is a function of the nuclear constant of one of said kinds of nuclei and a second signal whose frequency is a function of the nuclear constant of the other of said kinds of nuclei, a local oscillator having a frequency substantially equal to the frequency of said first signals, means for comparing the phase of the output of said local oscillator with the phase of one of said first signals and producing a control signal therefrom, means for conjointly controlling the flux densities of said magnetic fields from said control signal, means for comparing the phases of said first signals and for producing an error signal therefrom the magnitude and sense of which is dependent on the relative amount and direction of phase displacement between said first signals, means for differentially varying the flux densities of said magnetic fields by said error signal in a direction to reduce said error signal to zero, and means for deriving an output signal from a phase comparison of said second signals.

9. A nuclear gyroscope comprising, a magnetic structure composed of opposed E-members having a common central leg and air gaps between each of the opposed outer legs, energizing means for producing a magnetic field in said structure extending across each of said air gaps in opposite directions, a fluid sample of material in each of said air gaps, each sample containing aggregates of the same two selected kinds of nuclei, means for deriving a pair of nuclear signals from each sample in each of said air gaps, one of each of said pair of nuclear signals having a frequency dependent on the Larmor frequency of one of said kinds of nuclei and the other of each of said pair of nuclear signals having a frequency dependent on the Larmor frequency of the other of said kinds of nuclei, means for deriving an output signal representative of change in angular position in space by a comparison of the phases of one of each of said pairs of nuclear signals having similar frequencies, a coil surrounding said common central leg, means for comparing the phases of the others of said pairs of nuclear signals to produce a comparison signal and means for varying the energization of said coil in accordance with the magnitude and sense of said comparison signal.

10. A nuclear gyroscope as set forth in claim 9 including a local oscillator, comparison means having the output of said oscillator and one of said nuclear signals impressed thereon and producing a control error signal therefrom, and means conjointly controlling the flux densities of the magnetic fields in both of said air gaps in accordance with the magnitude and sense of said control error signal.

11. A nuclear gyroscope comprising, a magnetic structure composed of opposed E-members having a common central leg and gaps between each of the opposed outer legs, energizing means for producing a magnetic field in said structure extending across each of said gaps in opposite directions, a fluid sample of material positioned in each of said gaps, each sample containing aggregates of the same two selected kinds of nuclei, means for generating a pair of nuclear magnetic resonance signals in each of said samples, each one of said pairs of nuclear signals having frequencies corresponding to the Larmor frequencies of respective ones of said two kinds of nuclei, a receiving coil in each gap each of which has impressed thereon a respective pair of said nuclear magnetic resonance signals, a first phase detector having one of each pair of nuclear resonance signals corresponding to one kind of nuclei impressed thereon and producing an error signal therefrom representative of the phase difference between said signals, a coil surrounding said common leg, means for varying the energization of said coil in accordance with the sense and magnitude of said error signal, and phase comparison means having the remaining two of said pairs of nuclear resonance signals applied thereto and producing an output signal therefrom.

12. A nuclear gyroscope as set forth in claim 11 including a local oscillator, a phase comparator having the output of said oscillator and one of said nuclear magnetic resonance signals impressed thereon and producing a control error signal therefrom, and means conjointly controlling the densities of magnetic field in both said gaps in accordance with the magnitude of said control signal.

13. A nuclear gyroscope comprising, first, second, third and fourth magnetic structures each containing a magnetic gap and generating a magnetic field therein, said four structures being so positioned relative to each other that their field directions are parallel to three mutually perpendicular lines directed along the instrument orthogonal XYZ axes, said field directions having the respective directions $-Z$, $+Z$, $+X$ and $+Y$, a nuclear fluid sample in each said gap field, all of said samples containing aggregates of the same two kinds of atomic nuclei having measurable magnetic moment and angular momentum, magnetic bias means for each magnetic structure, means deriving first and second nuclear magnetic resonance signals from each of said samples, means comparing the phases of said first signals derived from said first and second magnetic structure fields to control through said bias means the relative magnetic flux densities in said first and second magnetic structure gaps, means comparing the phases of said second signals derived from said first and second magnetic structure fields to generate a signal representing change in orientation about said Z-axis relative to inertial space, means comparing the phases of said first signals derived from said first and third magnetic structure fields to control through said bias means the relative magnetic flux densities in said first and third magnetic structure gaps, means comparing the phases of said second signals derived from said first and third magnetic structure fields to generate a signal representing change in orientation about said X-axis relative to inertial space, means comparing the phases of said first signals derived from said first and fourth magnetic structure fields to control through said bias means the relative magnetic flux densities in said first and fourth magnetic structure gaps, and means comparing the phases of said second signals derived from said first and fourth magnetic structure fields to generate a signal representing change in orientation about said Y-axis relative to inertial space.

14. A nuclear gyroscope comprising, means producing at least two unidirectional magnetic fields in at least two different directions, a separate sample of material in each of said fields, each sample containing the same aggregates of at least two different selected kinds of particles, each sample containing particles of the same kinds, means for producing a pair of particle magnetic resonance signals from each sample in each of said fields, the frequency of each of said particle magnetic resonance signals being dependent upon the particular kind of particle from which the signal is derived, upon the rate of rotation of said last-named means relative to inertial space about the direction of the magnetic field applied to said sample and upon the magnetic flux density of the magnetic field, means for comparing two signals, one from each of two of said sample pairs, and for producing an equality in their phase relationship, and means for deriving at least one output signal representative of change of angular position of the gyroscope in space from the other signals of said sample pairs of signals.

15. A nuclear gyroscope in accordance with claim 14 in which said particles are atomic nuclei.

16. A nuclear gyroscope comprising, means producing two unidirectional magnetic fields in opposite directions, a sample of material in each of said fields, said sample containing aggregates of at least the same two selected kinds of nuclei in intimate association, said nuclei each having a measurable magnetic moment and angular momentum and giving a measurable nuclear magnetic resonance signal, means for producing a pair of nuclear magnetic resonance signals from each said sample, the frequency of each said signal being dependent upon the particular kind of nuclei from which it is derived, the rate of rotation of said last-named means relative to inertial space about the direction of the magnetic field applied thereto and upon the flux density of the magnetic field, whereby each pair of signals secured from a sample consists of a first signal whose frequency is a function of the effective nuclear constant of one of said kinds of nuclei in the sample and a second signal whose frequency is a function of the effective nuclear constant of another of said kinds of nuclei in the sample, a local oscillator having a frequency substantially equal to the frequency of said first signals, means for comparing the frequency of the output of said local oscillator with the frequency of one of said first signals and producing a control signal therefrom, means for conjointly controlling the magnetic flux densities of said magnetic fields from said control signal, means for comparing the phases of said first signals and for producing an error signal therefrom having magnitude and sense dependent upon the amount and direction of phase displacement between said first signals, means for differentially varying the flux densities of said magnetic fields by said error signal in a direction to reduce said error signal to zero, and means for deriving an output signal from a phase comparison of said second signals.

17. A nuclear gyroscope comprising, first, second, third and fourth magnetic structures each containing a magnetic gap and generating a magnetic field therein having a selected direction, said four structures being positioned to have their said selected field directions each parallel to one of three lines directed along instrumental axes X, Y and Z, said three axes lying in at least two different planes, said selected directions having the axial directions $-Z$, $+Z$, $+X$ and $+Y$, a nuclear fluid sample in each said gap field, all of said samples being identical, each said sample containing aggregates of the same two kinds of atomic nuclei having measurable magnetic moment and measurable angular momentum and being capable of giving a measurable nuclear magnetic resonance signal, magnetic bias means for each magnetic structure, means deriving first and second nuclear magnetic resonance signals from each of said samples, means comparing the phases of said first signals derived from said first and second magnetic structure fields to control through said bias means the relative magnetic flux densities in said first and second magnetic structure gaps, means comparing the phases of said second signals derived from said first and second magnetic structure fields to generate a signal representing change in orientation about said Z-axis relative to inertial space, means comparing the phases of said first signals derived from said first and third magnetic structure fields to control through said bias means the relative magnetic flux densities in said first and third magnetic structure gaps, means comparing the phases of said second signals derived from said first and third magnetic structure fields to generate a signal representing change in orientation about said X-axis relative to inertial space, means comparing the phases of said first signals derived from said first and fourth magnetic structure fields to control through said bias means the relative magnetic flux densities in said first and fourth magnetic structure gaps, and means comparing the phases of said second signals derived from said first and fourth magnetic structure fields to generate a signal representing change in orientation about said Y-axis relative to inertial space.

References Cited in the file of this patent
UNITED STATES PATENTS

| | | |
|---|---|---|
| 2,720,625 | Leete | Oct. 11, 1955 |
| 2,841,760 | Hansen | July 1, 1958 |
| 2,845,595 | Leete | July 29, 1958 |

OTHER REFERENCES

Thomas: Instrument, vol. 22, May 1949, pp. 430 to 432.

Smaller: Physical Review, vol. 83, No. 4, August 1951, pages 812 to 820.